Patented Feb. 24, 1925.

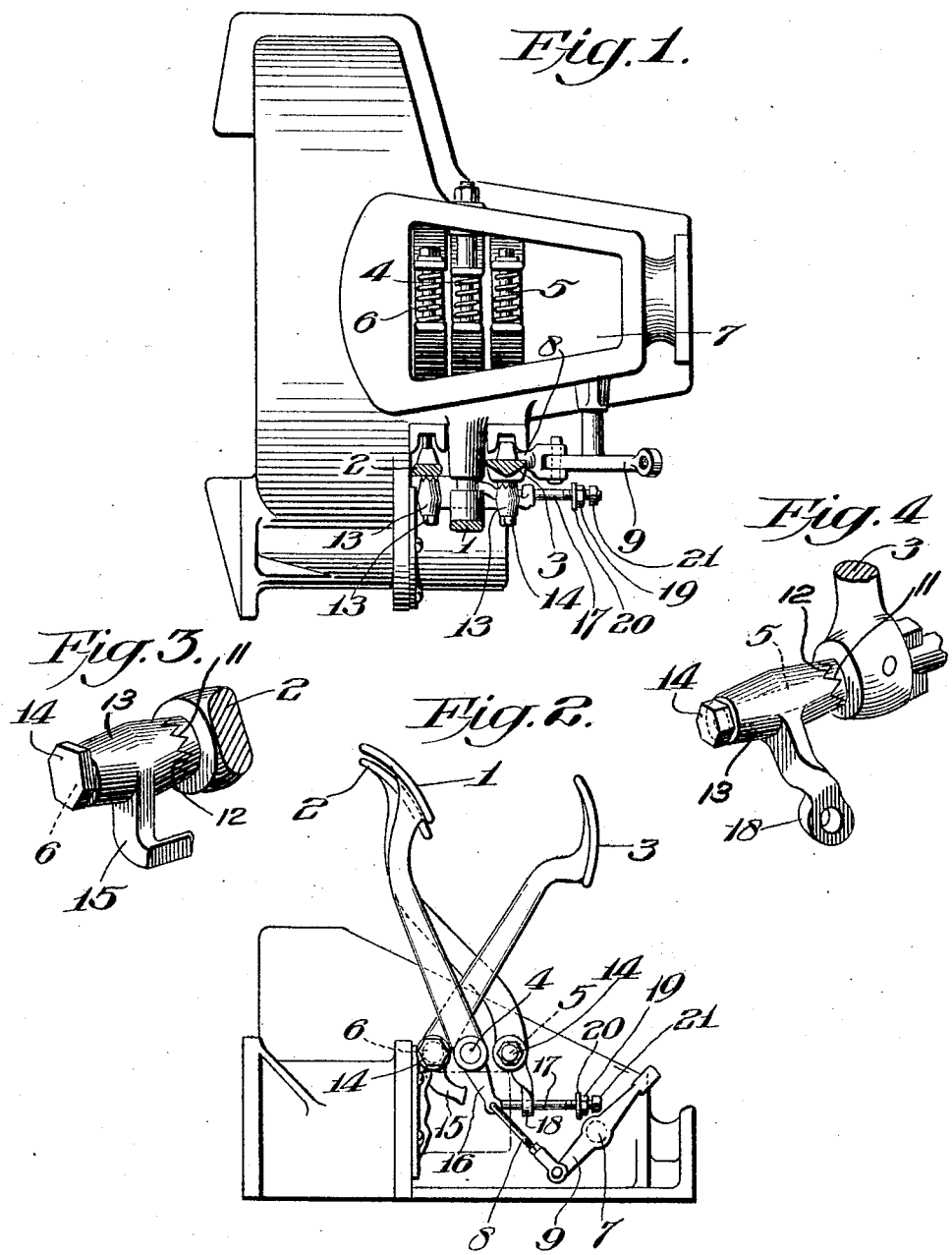

1,527,319

UNITED STATES PATENT OFFICE.

HARRY G. LEWIS, OF PHILADELPHIA, PENNSYLVANIA, ASSIGNOR TO NEVERSTALL DEVICE COMPANY, OF CAMDEN, NEW JERSEY, A CORPORATION OF NEW JERSEY.

NONSTALLING DEVICE FOR AUTOMOBILES.

Application filed February 13, 1924. Serial No. 692,523.

*To all whom it may concern:*

Be it known that I, HARRY G. LEWIS, a citizen of the United States, residing at Philadelphia, in the county of Philadelphia and State of Pennsylvania, have invented a certain new and useful Nonstalling Device for Automobiles, of which the following is a specification.

This invention relates to automobile controls, the object in view being to simplify the present day control used on automobiles for shifting to the different speeds and also shifting into reverse, and for shifting the clutch and also for applying and releasing the brake mechanism, the control as a whole, being similar to that used in connection with what is known as planetary transmission gearing and entirely doing away with the necessity of using the emergency brake lever in order to hold the clutch controlling lever in a neutral position.

By means of the construction hereinafter described and illustrated in the drawings, to stop the car it is only necessary to apply pressure on the brake pedal which serves not only to apply the brake but to first move the clutch shifting lever into its neutral position and latch the same in such position. To start the car, it is only necessary to operate the clutch pedal to put the car in what is known as low speed, whereupon the clutch shifting lever is automatically released or unlatched and the brake pedal is returned to its initial or non-braking position. After the car has been brought to a stop, if the operator desires to back the car, it is only necessary to press against the reverse pedal.

The leading object is to provide simple, efficient and comparatively inexpensive means for attaining the foregoing results. Other and further objects not at this time appearing will be described hereinafter.

The invention consists of the novel construction hereinafter described and finally claimed.

The nature, characteristic features and scope of the invention will be more fully understood from the following description taken in connection with the accompanying drawings forming part hereof, and in which:

Fig. 1, is a top or plan view partly sectioned of mechanism embodying the invention.

Fig. 2, is a view thereof in side elevation, and

Figs. 3 and 4 are detail views in perspective of certain of the parts shown in the foregoing figures.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings 1 designates the clutch pedal, 2 the brake pedal and 3 the reverse pedal, which pedals are connected with shafts 4, 5 and 6. The clutch pedal is connected with respect to the emergency brake shaft 7 by means of pivotal links 8 and 9. According to the present invention the clutch pedal 1 and its shaft 4 are not altered but remain intact according to Ford construction. However, the brake and reverse pedal shafts are removed from the Ford structure and those shown in the drawings substituted. Each of these shafts is provided with a tubular extension 10 the outer edge of which is provided with a plurality of notched parts or teeth 11. Adapted to register with the teeth 11 of each extension are other teeth 12 upon a tubular sleeve 13. Each sleeve 13 is secured to an extension by means of a bolt 14 which passes through a sleeve and engages the screw-threaded interior of a part 10. The pedals 2 and 3 are secured upon the parts 10. The sleeve 13 of the reverse pedal 3 has fixed thereto a lug 15 which in the forward movement of the said pedal is adapted to contact with the arm 16 of the clutch pedal 1 and automatically moves same to neutral position should said clutch pedal be in any other position at the time of reversal. Thus a car may have its movement reversed without throwing, manually, said pedal into neutral position. The clutch pedal arm 16 has pivotally connected therewith a rod 17 which has free movement through the aperture in a lug 18 fixed to the sleeve 13 of the brake pedal shaft. The end of said rod 17 is screw-threaded and has applied thereto a nut 19, washer 20, and lock nut 21. Should the clutch pedal be in a position other than neutral, forward movement of the brake pedal causes lug 18 to abut against washer 20 and draw clutch pedal 1 backward to neutral position. Thus a motor car of the Ford type may have its brake applied without manually operating the clutch pedal. To recapitulate, operation of reverse pedal disengages clutch pedal and operation of brake pedal releases clutch pedal. It is obvious that adjustments of parts may be readily effected because of the toothed connections above referred to. By loosening of the bolts 14 a sleeve may be disengaged from the teeth of a before-mentioned shaft extension, then moved around its longitudinal axis to proper position, the sleeve caused to re-engage such extension and the bolt tightened. Also adjustment of parts may be had by adjusting nut 19 on rod 17 toward or away from lug 18.

Having thus described my invention, what I claim as new and desire to secure by Letters Patent, is:

1. In combination a clutch pedal having connected therewith a rearwardly extended rod having an adjustable stop at its end, a brake pedal having a depending apertured lug through which said rod is extended and a reverse pedal having a depending lug, said brake pedal lug and said reverse pedal lug being adapted to coact with said clutch pedal to shift same to neutral position under predetermined conditions.

2. In combination a clutch pedal having connected therewith a rearwardly extended rod having an adjustable stop at its end, a two part brake pedal shaft detachably and adjustably secured together, a brake pedal fixed to one part and a depending, apertured lug fixed to the other part, said rod passing through the aperture of said lug, a reverse pedal shaft, one part of which reverse pedal shaft has fixed thereto a reverse pedal and the other part of which has fixed thereto a depending lug.

3. A pedal shaft construction comprising a two-part adjustable shaft of which one part has an interiorly screw-threaded and toothed end carrying a pedal and of which the other part comprises a sleeve having a toothed end to cooperatively engage said first mentioned part, and a bolt passing through said sleeve and engaging within said screw-threaded end to interlock the part in adjusted position.

4. A pedal shaft construction comprising a two-part adjustable shaft of which one part has an interiorly screw-threaded and toothed end carrying a pedal and of which the other part comprises a sleeve having a toothed end to cooperatively engage said first mentioned part, a lug depending from said sleeve, and a bolt passing through said sleeve and engaging within said screw-threaded end to interlock the part in adjusted position.

5. In combination a clutch pedal having connected therewith a rearwardly extended rod having an adjustable stop at its end, a brake pedal having a depending apertured lug through which said rod is extended and a reverse pedal having a depending lug, said brake pedal lug and said reverse pedal lug being adapted to coact with said clutch pedal to shift same to neutral position under predetermined conditions, and means for adjusting said lugs in an arc of a circle.

In testimony whereof, I have hereunto signed my name.

HARRY G. LEWIS.